US012597391B2

(12) United States Patent
Tu et al.

(10) Patent No.: US 12,597,391 B2
(45) Date of Patent: Apr. 7, 2026

(54) DISPLAY PIXEL CIRCUITRY WITH SHARED EMISSION TRANSISTORS

(71) Applicant: Apple Inc., Cupertino, CA (US)

(72) Inventors: Ran Tu, Palo Alto, CA (US); Aida R Colon-Berrios, Cupertino, CA (US); Chen Lun Chiu, Hsinchu (TW); Chin-Wei Lin, San Jose, CA (US); Fan Gui, Sunnyvale, CA (US); Levent Erdal Aygun, Santa Clara, CA (US); Xintong Li, San Diego, CA (US); Xuan Hu, San Jose, CA (US); Yi Zhao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/051,015

(22) Filed: Feb. 11, 2025

(65) Prior Publication Data

US 2025/0356807 A1 Nov. 20, 2025

Related U.S. Application Data

(60) Provisional application No. 63/648,585, filed on May 16, 2024.

(51) Int. Cl.
*G09G 3/3241* (2016.01)
*G09G 3/3266* (2016.01)

(52) U.S. Cl.
CPC ......... *G09G 3/3241* (2013.01); *G09G 3/3266* (2013.01); *G09G 2310/08* (2013.01); *G09G 2320/0233* (2013.01); *G09G 2320/0247* (2013.01); *G09G 2320/0673* (2013.01); *G09G 2330/021* (2013.01)

(58) Field of Classification Search
CPC ............... G09G 3/3241; G09G 3/3266; G09G 2310/08; G09G 2320/0233; G09G 2320/0247; G09G 2320/0673; G09G 2330/021
See application file for complete search history.

(56) References Cited

U.S. PATENT DOCUMENTS

| | | | | |
|---|---|---|---|---|
| 7,110,579 B2 * | 9/2006 | Hashimoto | ............ | G06V 40/13<br>382/284 |
| 10,504,427 B2 | 12/2019 | Yang et al. | | |
| 11,100,846 B2 | 8/2021 | Xuan et al. | | |
| 2017/0124953 A1 * | 5/2017 | Shim | .................... | G09G 3/2018 |
| 2018/0130413 A1 * | 5/2018 | Saito | .................... | G09G 3/2018 |

(Continued)

FOREIGN PATENT DOCUMENTS

CN 117437887 A 1/2024

*Primary Examiner* — Kwang-Su Yang
(74) *Attorney, Agent, or Firm* — Trey Ley Group; Jason Tsai

(57) ABSTRACT

A display is provided that includes an array of subpixels that receive data signals from display driver circuitry and that receive control signals from gate driver circuitry. Multiple subpixels in a pixel unit can be coupled to a shared emission transistor configured to receive an emission control signal. Each subpixel in the unit can include an anode reset transistor configured to receive the emission control signal. The display can be operable in a first mode where each pixel has a first number of subpixels and in a second mode where each pixel has a second number of subpixels. Each pixel unit can have a symmetrical layout.

19 Claims, 8 Drawing Sheets

(56) References Cited

U.S. PATENT DOCUMENTS

| | | | | |
|---|---|---|---|---|
| 2018/0137818 | A1* | 5/2018 | Kim et al. | G09G 3/2003 |
| 2020/0027403 | A1* | 1/2020 | Chang | G09G 3/3258 |
| 2021/0012712 | A1* | 1/2021 | Lin | G09G 3/3291 |
| 2023/0225163 | A1* | 7/2023 | Kim et al. | H10K 59/1216<br>257/40 |
| 2024/0038135 | A1* | 2/2024 | Kim et al. | G09G 3/3233 |
| 2024/0265875 | A1* | 8/2024 | Liu | G09G 3/3233 |
| 2025/0140182 | A1* | 5/2025 | Yuan | G09G 3/3233 |

* cited by examiner

DISPLAY PIXEL CIRCUITRY WITH SHARED EMISSION TRANSISTORS

This application claims the benefit of U.S. Provisional Patent Application No. 63/648,585, filed May 16, 2024, which is hereby incorporated by reference herein in its entirety.

FIELD

This relates generally to electronic devices with displays and, more particularly, to displays such as organic light-emitting diode displays.

BACKGROUND

Displays such as organic light-emitting diode displays have an array of display pixels based on light-emitting diodes. In such type of displays, each display pixel includes a light-emitting diode and thin-film transistors for controlling the application of a data signal to the light-emitting diode to produce light.

It can be challenging to design an organic light-emitting diode display with high pixel density while minimizing power consumption. It is within this context that the embodiments herein arise.

SUMMARY

An aspect of the disclosure provides display circuitry that includes a first subpixel having a first drive transistor coupled in series with a first light-emitting diode, a second subpixel having a second drive transistor coupled in series with a second light-emitting diode, where the first and second subpixels have mirrored transistor layouts, and an emission transistor shared between at least the first and second subpixels, the emission transistor being coupled to a source-drain terminal of the first drive transistor of the first subpixel and to a source-drain terminal of the second drive transistor of the second subpixel. The display circuitry can further include a third subpixel having a third drive transistor coupled in series with a third light-emitting diode and having a source-drain terminal coupled to the emission transistor and a fourth subpixel having a fourth drive transistor coupled in series with a fourth light-emitting diode and having a source-drain terminal coupled to the emission transistor.

An aspect of the disclosure provides display circuitry operable in at least a first mode and a second mode. The display circuitry can include a plurality of subpixels arranged in rows and columns. At least two subpixels in the plurality of subpixels are coupled to a shared emission transistor. During the first mode, the plurality of subpixels are organized into pixels each having a first number of subpixels. During the second mode, the plurality of subpixels can be organized into pixels each having a second number of subpixels different than the first number of subpixels. During the first mode, the plurality of subpixels can be configured to output three-dimensional content. During the second mode, the plurality of subpixels can be configured to output two-dimensional content.

An aspect of the disclosure provides display circuitry that includes a first subpixel disposed in a first row and a first column, a second subpixel disposed in the first row and a second column, a third subpixel disposed in a second row and the first column, a fourth subpixel disposed in the second row and the second column, and an emission line that is shared among the first, second, third, and fourth subpixels. The first and second subpixels can be symmetrical with respect to the third and fourth subpixels about the emission line. The display circuitry can further include a reference voltage line that is shared among the first, second, third, and fourth subpixels and an anode reset voltage line that is shared among the first, second, third, and fourth subpixels. The display circuitry can further include: a first scan line driver configured to output a first scan signal to a first data loading transistor in the first subpixel and to a second data loading transistor in the second subpixel; a second scan line driver configured to output a second scan signal to a third data loading transistor in the third subpixel and to a fourth data loading transistor in the fourth subpixel; and a third scan line driver configured to output a third scan signal to a first reference transistor in the first subpixel, to a second reference transistor in the second subpixel, to a third reference transistor in the third subpixel, and to a fourth reference transistor in the fourth subpixel.

DETAILED DESCRIPTION

Figure 1:
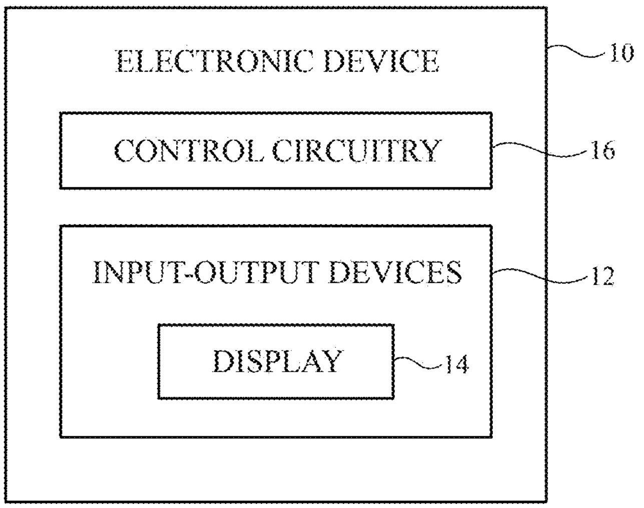
FIG. 1 is a diagram of an illustrative electronic device having a display in accordance with some embodiments.

An illustrative electronic device of the type that may be provided with a display is shown in FIG. 1. As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14 using an array of pixels in display 14.

Device 10 may be a tablet computer, laptop computer, a desktop computer, a display, a cellular telephone, a media player, a wristwatch device or other wearable electronic equipment such as a head-mounted device, or other suitable electronic device.

Display 14 may be an organic light-emitting diode display or may be a display based on other types of display technology. Configurations in which display 14 is an organic light-emitting diode display are sometimes described herein as an example. This is, however, merely illustrative. Any suitable type of display may be used in device 10, if desired.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Figure 2:
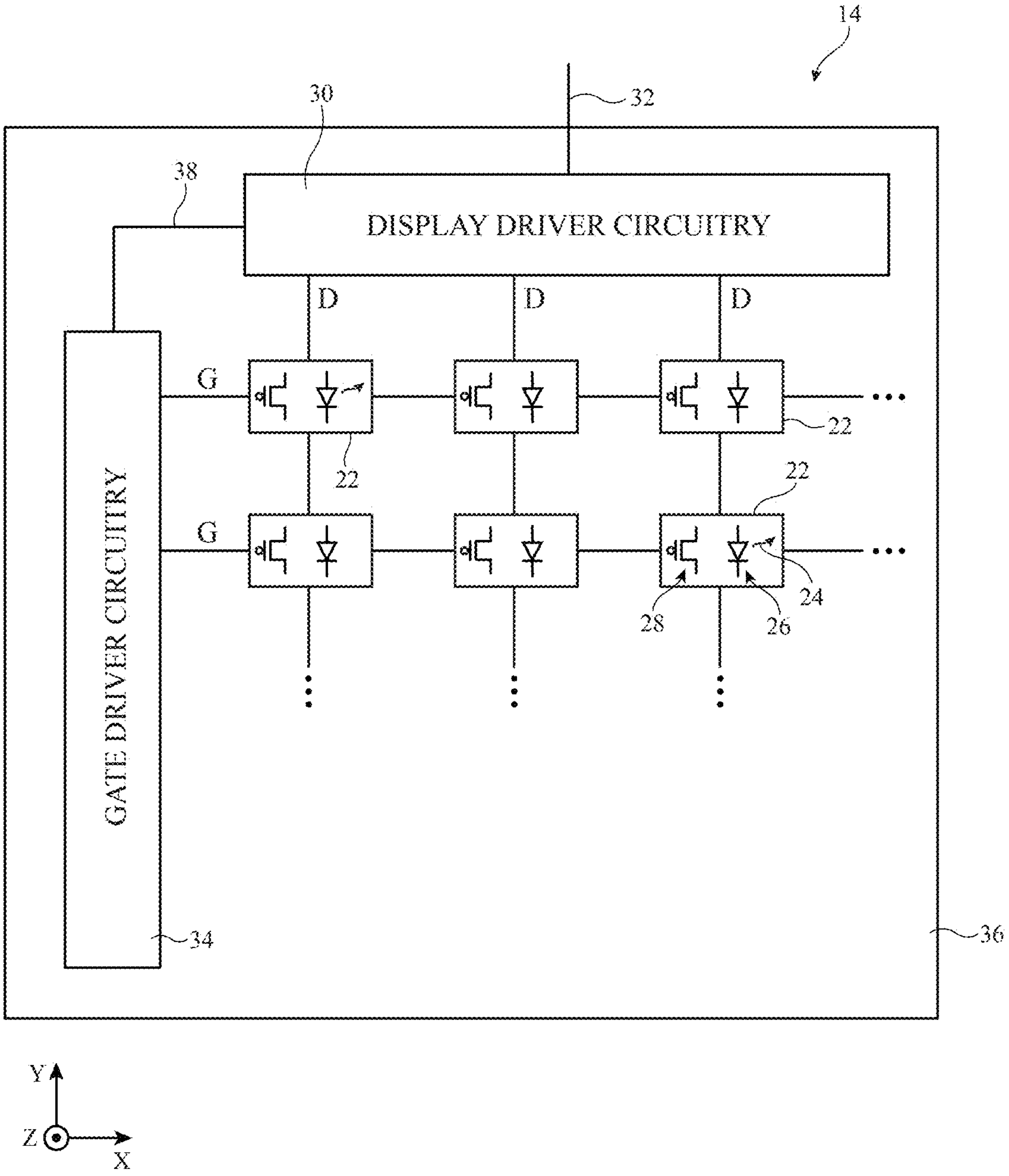
FIG. 2 is a diagram of an illustrative display having an array of organic light-emitting diode display pixels in accordance with some embodiments.

A top plan view of a portion of display 14 is shown in FIG. 2. As shown in FIG. 2, display 14 may have an array of pixels 22 formed on substrate 36. Pixels 22 within display 14 can be referred to as display pixels. Substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may have a light-emitting diode 26 that emits light 24 under the control of a pixel control circuit formed from thin-film transistor circuitry such as thin-film transistors 28 and thin-film capacitors). Thin-film transistors 28 may be polysilicon thin-film transistors, semiconducting-oxide thin-film transistors such as indium zinc gallium oxide transistors, or thin-film transistors formed from other semiconductors. Pixels 22 may contain light-emitting diodes of different colors (e.g., red, green, and blue subpixels) to provide display 14 with the ability to display color images.

Display driver circuitry may be used to control the operation of pixels 22. The display driver circuitry may be formed from integrated circuits, thin-film transistor circuits, or other suitable electronic circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D (e.g., data lines that run down the columns of pixels 22) while issuing clock signals and other control signals to supporting display driver circuitry such as gate driver circuitry 34 over path 38. If desired, circuitry 30 may also supply clock signals and other control signals to gate driver circuitry 34 on an opposing edge of display 14 (e.g., the gate driver circuitry may be formed on more than one side of the display pixel array).

Gate driver circuitry 34 (sometimes referred to as horizontal line control/driver circuitry or row control/driver circuitry) may be implemented as part of an integrated circuit and/or may be implemented using thin-film transistor circuitry. Horizontal/row control lines G in display 14 may carry gate line signals (scan line signals), emission enable control signals, and other horizontal control signals for controlling the pixels of each row. There may be any suitable number of horizontal control signals per row of pixels 22 (e.g., one or more row control lines, two or more row control lines, three or more row control lines, four or more row control lines, five or more row control lines, etc.).

Figure 3:
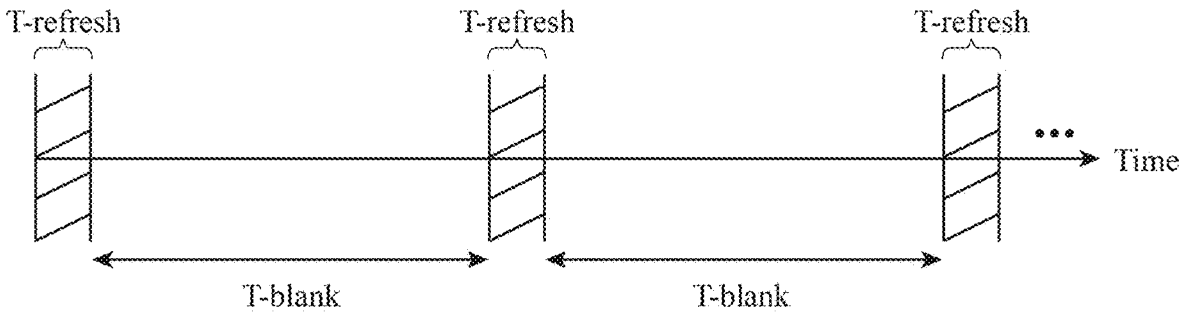
FIG. 3 is a diagram of a low refresh rate display driving scheme in accordance with an embodiment.

Display 14 can be configured to support low refresh rate operation. Operating display 14 using a relatively low refresh rate (e.g., a refresh rate of 1 Hz, less than 1 Hz, 2 Hz, 1-10 Hz, less than 30 Hz, less than 60 Hz, or other suitable low frequency) may be suitable for applications outputting content that is static or nearly static and/or for applications that require minimal power consumption. FIG. 3 is a diagram of a low refresh rate display driving scheme in accordance with some embodiments. As shown in FIG. 3, display 14 may alternate between a short data refresh period (as indicated by period T_refresh) and an extended blanking period (as indicated by period T_blank). As an example, each data refresh period T_refresh may be approximately 16.67 milliseconds (ms) in accordance with a 60 Hz data refresh operation, whereas each blanking period T_blank may be approximately 1 second so that the overall display refresh rate of display 14 is lowered to 1 Hz. Configured as such, duration T_blank can be adjusted to tune the overall refresh rate of display 14. For example, if the duration of T_blank were tuned to 0.5 second, the overall refresh rate would be increased to approximately 2 Hz. In the embodiments described herein, T_blank may be at least two times, at least ten times, at least 30 times, or at least 60 times longer in duration than T_refresh (as examples).

Figure 4:
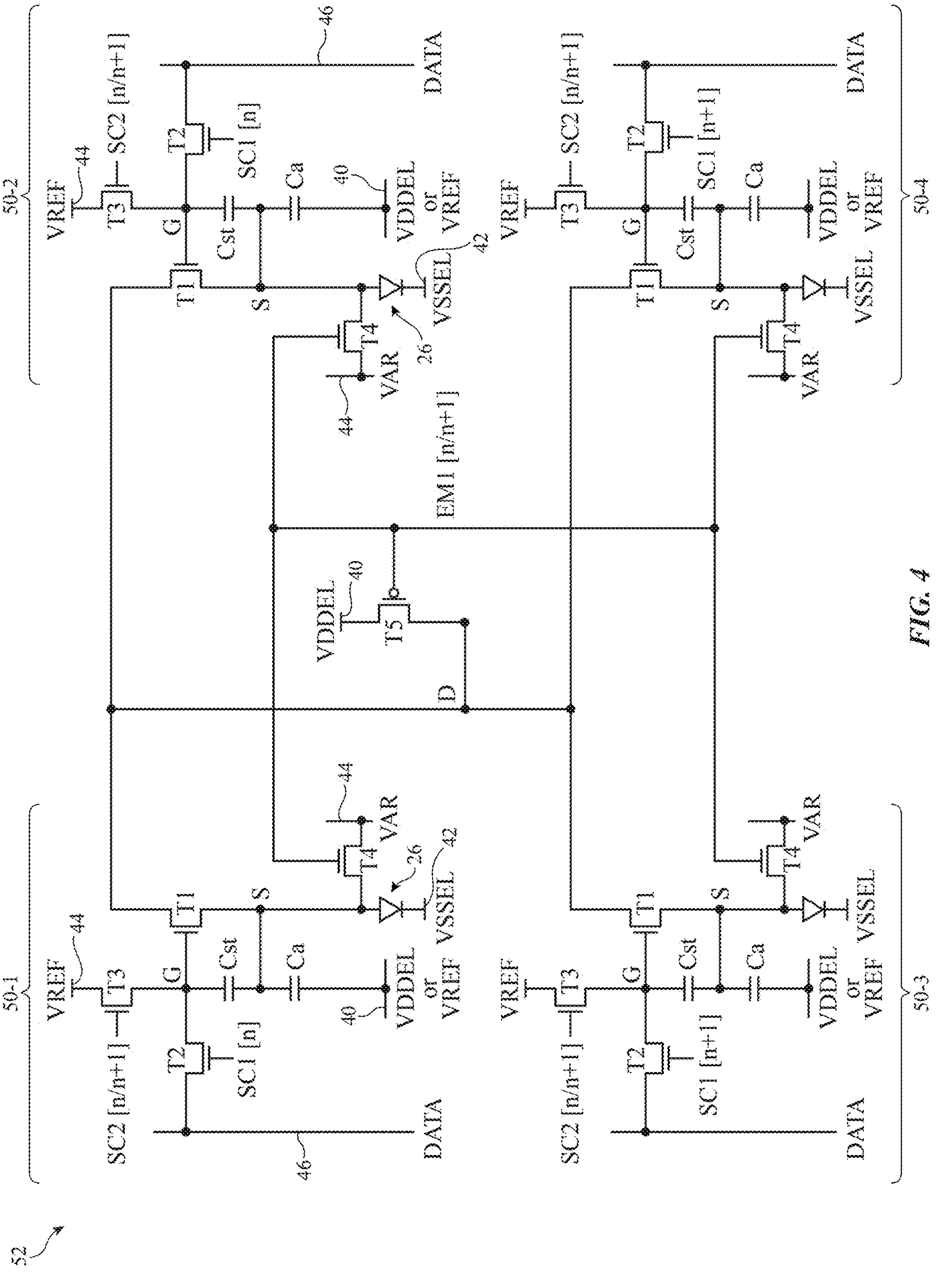
FIG. 4 is a circuit diagram showing multiple display subpixels coupled to a shared emission transistor in accordance with some embodiments.

FIG. 4 is a circuit diagram of a pixel unit 52 that includes multiple subpixels coupled to a shared emission transistor in accordance with some embodiments. The terminology of a pixel "unit" does not necessarily correspond to a "pixel." A pixel "unit" can generally refer to and be defined herein as a group of subpixels coupled to a shared emission transistor, a shared emission line, a shared reference voltage line, and/or a shared anode reset voltage line. In particular, the example of FIG. 4 shows four subpixels 50-1, 50-2, 50-3, and 50-4 being coupled to shared emission transistor T5. Each of the subpixels 50 can represent a red subpixel, a blue subpixel, a green subpixel, a cyan subpixel, a magenta subpixel, a yellow subpixel, a clear subpixel, or a subpixel of another color or shade of color. As shown in FIG. 4, each subpixel 50 can include its own thin-film transistors such as transistors T1-T4, two capacitors such as capacitors Cst and Ca, and an organic light-emitting diode 26. Transistors T1-T4 can be n-type semiconducting oxide transistors. "Semiconducting oxide transistors" can refer to and be defined herein as thin-film transistors having a channel region formed from semiconducting oxide material (e.g., indium gallium zinc oxide or IGZO, indium tin zinc oxide or ITZO, indium gallium tin zinc oxide or IGTZO, indium tin oxide or ITO, or other semiconducting oxide material).

A semiconducting oxide transistor is notably different than a "silicon transistor," which can refer to a transistor having a polysilicon channel region deposited using a low temperature process sometimes referred to as LTPS or low-temperature polysilicon. Semiconducting oxide transistors exhibit relatively lower leakage than silicon transistors, so implementing at least some of the transistors within a subpixel can help reduce flicker and luminance non-uniformity (e.g., by preventing current from leaking away from a storage node). If desired, at least some of the transistors within a subpixel 50 may be implemented as silicon transistors such that subpixel 50 has a hybrid configuration that includes a combination of semiconducting oxide transistors and silicon transistors (e.g., n-type LTPS transistors or p-type LTPS transistors). Configurations in which all of the transistors within each subpixel 50 are semiconducting oxide transistors are sometimes described herein as an example.

Transistor T1 (sometimes referred to herein as a "drive transistor") may have a drain terminal coupled to node D, a gate terminal coupled to node G, and a source terminal coupled to node S. The terms "source" and "drain" are sometimes used interchangeably when referring to current-conducting terminals of a thin-film transistor. The source and drain terminals are therefore sometimes referred to as "source-drain" terminals (e.g., a transistor has a gate terminal, a first source-drain terminal, and a second source-drain terminal). For instance, the drain terminal of transistor T1 can be referred to as a first source-drain terminal, whereas the source terminal of transistor T1 can be referred to as a second source-drain terminal, or vice versa. Capacitor Cst (sometimes referred to as a storage capacitor) may be coupled across the gate and source terminals of transistor T1 and may be configured to store a data value for a subpixel 50.

The term "activate" with respect to a switch (or transistor) may refer to or be defined herein as an action that places the switch in an "on" or low-impedance state such that the two terminals of the switch are electrically connected to conduct current. Activating a switch can sometimes be referred to as turning on or closing a switch. The term "deactivate" with respect to a switch (or transistor) may refer to or be defined herein as an action that places the switch in an "off" or high-impedance state such that the two terminals of the switch/transistor are electrically disconnected with minimal leakage current. Deactivating a switch can sometimes be referred to as turning off or opening a switch.

Organic light-emitting diode 26 may have an anode terminal coupled to the source terminal of drive transistor T1 and a cathode terminal coupled to a ground power supply line 42 (e.g., a ground line on which ground power supply voltage VSSEL is provided). Ground power supply voltage VSSEL may be 0 V, −1 V, −2 V, −3 V, −4 V, −5 V, −6V, −7 V, −8 V, −9 V, less than 2 V, less than 1 V, less than 0 V, less than −5 V, +1 V, +2 V, or any suitable ground or negative power supply voltage level. Diode 26 can be considered connected in series with drive transistor T1. Diode 26 may have an associated parasitic capacitance, which can vary from pixel-to-pixel and change over its lifetime. The size of the diode parasitic capacitance, relative to the storage capacitance Cst, can affect the amount of applied data voltage appearing across transistor T1 and can thus affect the amount of drive current flowing through the drive transistor into diode 26, which directly impacts the luminance of each subpixel 50. To help mitigate the effects of variance of the diode parasitic capacitance across the pixel array, each display subpixel 50 can be provided with capacitor Ca coupled between the anode terminal of diode 26 and voltage line 40. Capacitor Ca may be sized larger than the diode parasitic capacitance. Voltage line 40 may be configured to receive a positive power supply voltage VDDEL or a reference voltage VREF. If desired, voltage line 40 can alternatively be coupled to a ground voltage, a negative voltage, a positive voltage, a voltage that is equal to VSSEL, a voltage that is different than VDDEL or VREF, or other static (direct current) voltage. Connected in this way, capacitor Ca can help mitigate the variation in the diode parasitic capacitance, which can help enhance pixel-to-pixel luminance uniformity. Capacitor Ca can also be referred to as a secondary storage capacitor while capacitor Cst serves as the primary storage capacitor. Capacitor Ca can also help extend the data range by capacitively coupling with Cst. Configured in this way, only part of the applied Vdata appears across the gate and source nodes of the drive transistor T1. A larger data range helps to relieve some burden on display driver circuitry 30 (FIG. 2) by increasing the gray level step size. The use of capacitor Ca in subpixel 50 is optional.

Transistor T2 may have a first source-drain terminal coupled to the gate terminal of transistor T1, a second source-drain terminal coupled to a data line 46, and a gate terminal configured to receive a first scan (control) signal SC1. For subpixel 50-1 and 50-2 located along a first row of subpixels, the first scan signal can be SC1[n]. For subpixels 50-3 and 50-4 located along a second row of subpixels (e.g., a second row of subpixels adjacent to the first row of subpixels), the first scan signal can be SC1[n+1]. The notations "[n]" and "[n+1]" denote how SC1[n] is generated by a first SC1 peripheral gate driver corresponding to the first row of subpixels and how SC1[n+1] is generated by a second SC1 peripheral gate driver corresponding to the second row of subpixels. Scan signals SC1[n] and SC[n+1] may be row control signals. Scan signal SC1 can be asserted (e.g., driven high) to activate transistor T2 to load a data signal onto node G and can be deasserted (e.g., driven low) to deactivate transistor T2. Transistor T2 configured to program subpixel 50 with a data value is thus sometimes referred to as a data loading (programming) transistor.

Transistor T3 may have a first source-drain terminal coupled to the gate terminal of transistor T1, a second source-drain terminal coupled to a reference voltage line 44 (e.g., a horizontal or vertical signal line on which a reference voltage Vref is provided), and a gate terminal configured to receive a second scan (control) signal SC2. In the example of FIG. 4, all four subpixels 50 along the two rows are configured to receive second scan signal SC2[n/n+1]. The notation "[n/n+1]" can denote how scan signal SC[n/n+1] is generated by another gate driver circuit that is shared between the two rows of subpixels. Scan signal SC2[n/n+1] may be a row control signal. Scan signal SC2 can be asserted (e.g., driven high) to activate transistor T3 to bias node G to the Vref voltage level and can be deasserted (e.g., driven low) to deactivate transistor T3. Transistor T3 configured to bias gate G to a reference voltage level is thus sometimes referred to as a reference transistor or a gate-voltage-setting transistor.

Transistor T4 may have a first source-drain terminal coupled to the anode terminal of diode 26, a second source-drain terminal coupled to an anode reset voltage line 44 (e.g., a voltage line on which a static or dynamically adjustable anode reset voltage Var is provided), and a gate terminal configured to receive an emission (control) signal EM1. Transistor T4 can be referred to as an anode reset transistor.

In the example of FIG. 4, four subpixels 50 can be coupled to a shared/common emission transistor T5. In particular, the drain terminal of drive transistor T1 of subpixel 50-1 in the first subpixel row, the drain terminal of drive transistor T1 of subpixel 50-2 in the first subpixel row, the drain terminal of drive transistor T1 of subpixel 50-3 in the second subpixel row, and the drain terminal of drive transistor T1 of subpixel 50-4 in the second subpixel row can all be coupled to the drain terminal of emission transistor T5. Emission transistor T5 may have a source terminal coupled to the positive power supply line 40 and a gate terminal configured to receive emission control signal EM1.

In particular, emission transistor T5 may be a p-type silicon transistor. Implementing emission transistor T5 as a p-type silicon transistor while implementing the anode reset transistors T4 as n-type semiconducting oxide transistors allows transistors T4 and T5 to be simultaneously controlled by emission signal EM1. Here, the notation "[n/n+1]" can denote how emission signal EM1[n/n+1] is generated by another gate driver circuit that is shared between the two rows of subpixels. Scan signal EM [n/n+1] may be a row control signal. When EM1 is driven high, transistor T4 is activated while transistor T5 is deactivated. When EM1 is driven low, transistor T4 is deactivated while transistor T5 is activated. Sharing emission transistor T5 between more than one display subpixel while using emission signal EM1 to drive not only emission transistor T5 but also one or more anode reset transistors T4 can be technically advantageous and beneficial to minimize pixel circuit area while minimizing the number of peripheral gate drivers that are needed within gate driver circuitry 34 (see FIG. 2).

The example of FIG. 4 in which an emission transistor T5 is shared among four subpixels 50 across two subpixel rows is illustrative. In other embodiments, emission transistor T5 can optionally be shared among more than two subpixels along a given row, among subpixels in three or more rows, among two or more subpixels 50, among three or more subpixels 50, among four or more subpixels, among 4-10 subpixels, among 10 or more subpixels, or among any suitable number of subpixels in one or more rows.

Figure 5:
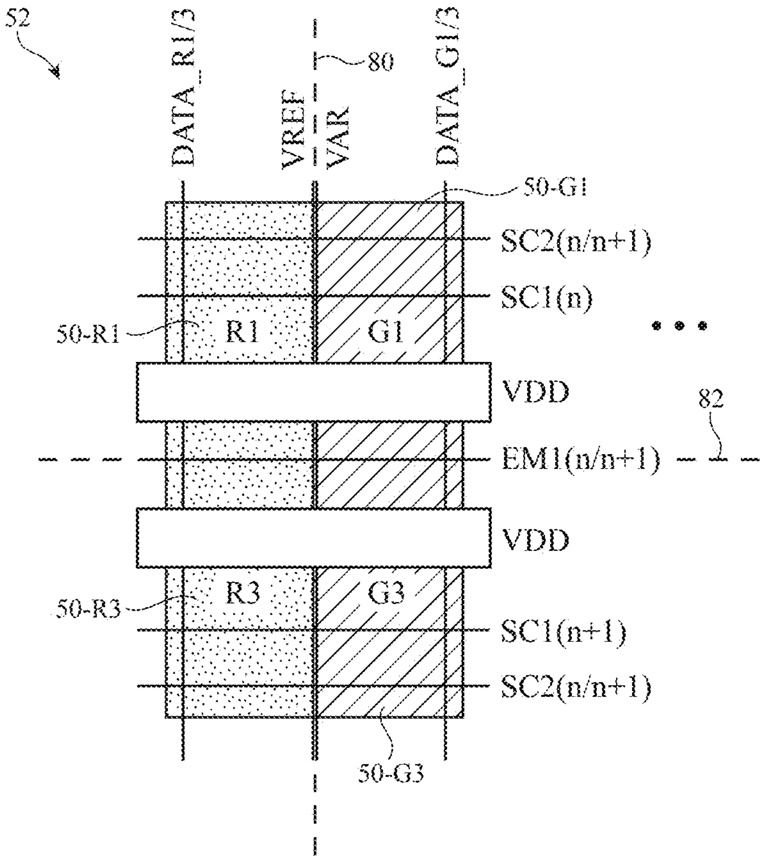
FIG. 5 is a top (plan) layout view showing how multiple display subpixels can share one or more signal lines in accordance with some embodiments.

FIG. 5 is a top (plan) layout view showing how multiple display subpixels can share one or more signal lines. As shown in FIG. 5, a red subpixel such as red subpixel 50-R1 and a green subpixel such as green subpixel 50-G1 may be disposed along a first subpixel row, whereas another red subpixel such as red subpixel 50-R3 and another green subpixel such as green subpixel 50-G3 may be disposed along a second subpixel row adjacent to the first subpixel row. The four subpixels 50 of FIG. 5 can represent one pixel unit 52 having a shared emission transistor of the type described in connection with FIG. 4.

In accordance with an embodiment, subpixels 50-R1 and 50-R3 can be mirrored with respect to subpixels 50-G1 and 50-G3 (e.g., the red subpixels are symmetrical with respect to the green subpixels about dotted line 80). Configured in this way, the first column of subpixels and the second column of subpixels can share column lines configured to convey reference voltage VREF and anode reset voltage VAR. In the example of FIG. 4, subpixels 50-R1 and 50-G1 can also be mirrored with respect to subpixels 50-R3 and 50-G3 (e.g., the first row of subpixels are symmetrical with respect to the second row of subpixels about dotted line 82). Configured in this way, all four subpixels in pixel unit 52 can be coupled to a shared emission line disposed along symmetry line 82 and configured to receive emission signal EM1(n/n+1). Emission signal EM1(n/n+1) may be generated by one peripheral emission gate driver circuit. Arranged in this way, subpixels 50-R1 and 50-G1 can be considered to have mirrored transistor layouts. Similarly, subpixels 50-R1 and 50-R3 can also be considered to have mirrored transistor layouts.

Subpixels 50-R1 and 50-R3 can be coupled to a first (column) data line DATA_R1/3 routed along the left peripheral edge of pixel unit 52, as shown in the orientation of FIG. 5. Subpixels 50-G1 and 50-G3 can be coupled to a second (column) data line DATA_G1/3 routed along the right peripheral edge of pixel unit 52. Subpixels 50-R1 and 50-G1 can receive a scan control signal SC1(n) from a first peripheral SC1 gate driver circuit, whereas subpixels 50-R3 and 50-G3 can receive a scan control signal SC1(n+1) from a second peripheral SC1 gate driver circuit. All four subpixels can receive scan control signal SC2(n/n+1) from one peripheral SC2 gate driver circuit. The subpixels such as 50-R1 and 50-G1 in the first row of subpixels can also be coupled to a first VDD power supply (row) line, whereas the subpixels such as 50-R3 and 50-G3 in the second row of subpixels can be coupled to a second VDD power supply (row) line.

Figure 6:
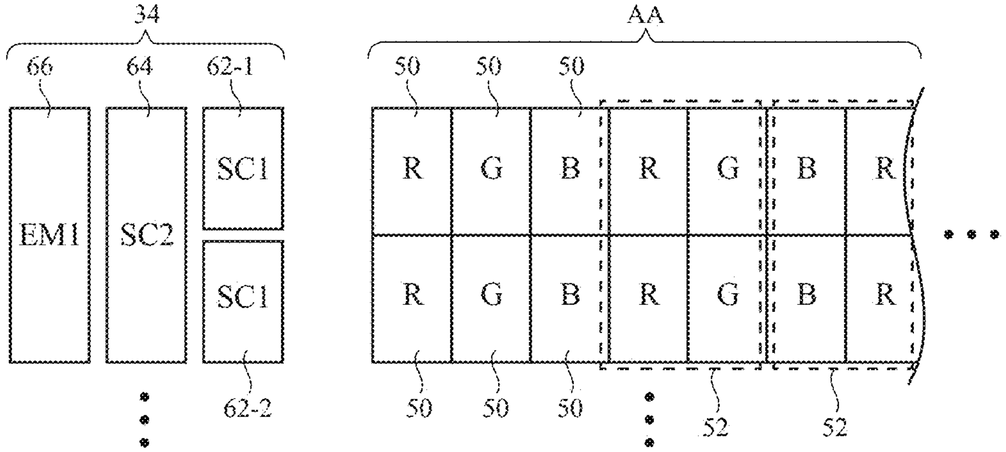
FIG. 6 is a top (plan) view showing illustrative gate driver circuits configured to output control signals for at least two rows of display subpixels in accordance with some embodiments.

FIG. 6 is a top (plan) view showing illustrative gate driver circuits configured to output control signals for at least two rows of display subpixels in accordance with some embodiments. As shown in FIG. 6, a first row of subpixels can include a first repeating series of red (R), green (G), and blue (B) subpixels 50, whereas a second row of subpixels can include a second repeating series of RGB subpixels 50. The red subpixels in the first row can be aligned with the red subpixels in the second row; the green subpixels in the first row can be aligned with the green subpixels in the second row; and the blue subpixels in the first row can be aligned with the blue subpixels in the second row, where the term "aligned" here refers to two or more pixels being disposed along the same column. Groups of four subpixels can be considered separate pixel units 52 that share a common emission transistor (see dotted boxes in FIG. 6). Such grouping and order or RGB subpixels is exemplary. Other color patterns and grouping of subpixels can be employed, if desired.

In the arrangement of FIG. 6, the first row of subpixels can receive a first SC1 signal (e.g., signal SC1(n)) from peripheral gate driver 62-1, whereas the second row of subpixels can receive a second SC1 signal (e.g., signal SC1(n+1)) from peripheral gate driver 62-2 separate from gate driver 62-1. The first and second rows of subpixels can receive an SC2 signal (e.g., signal SC2(n/n+1)) from one peripheral gate driver 64. The first and second rows of subpixels can receive an emission signal EM1 (e.g., signal EM1(n/n+1)) from one emission gate driver 66. Gate drivers 62-1, 62-2, 64, and 66 can all be considered part of gate driver circuitry 34 disposed along a peripheral edge of the display active area AA. Other subpixel rows in the active area can be repeated in this way. The example of FIG. 6 (and FIG. 2) in which gate driver circuitry 34 is disposed along one peripheral edge of the active area is illustrative. If desired, gate driver circuitry 34 can be disposed along two (opposing) peripheral edges of the active area (e.g., such that the gate driver circuits drive control signals from opposite sides of the pixel array), along three or more edges of the active area, or along all four edges of the active area.

Figure 7:
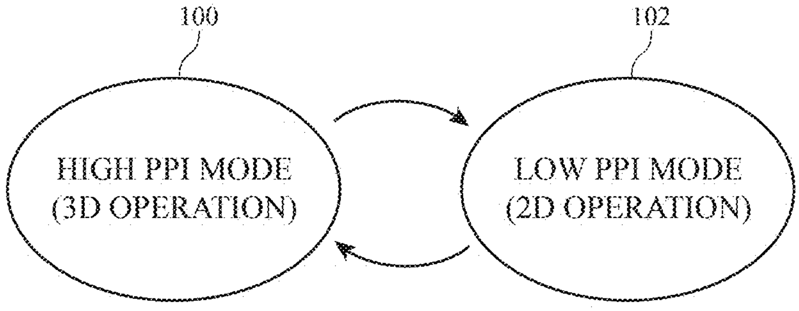
FIG. 7 is a state diagram illustrating how a display of the type shown in FIGS. 1-6 can operate between at least two modes of operation in accordance with some embodiments.
Figure 8:
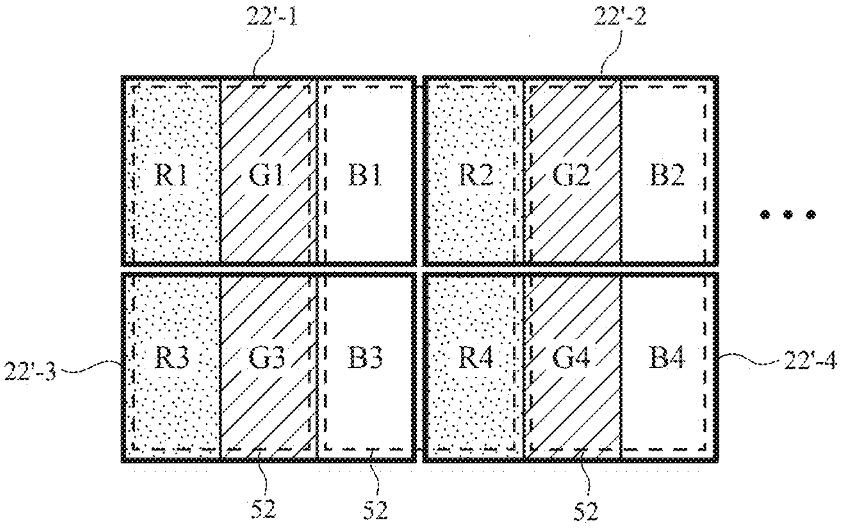
FIG. 8 is a top (plan) view showing a first grouping of display subpixels that can be employed during a first of the two operating modes of FIG. 7 in accordance with some embodiments.

Display 14 of the type described in connection with FIGS. 1-6 can be operable in at least two different modes. As shown in FIG. 7, display 14 can be operated in at least a first mode 100 and a second mode 102. During the first display mode 100, display 14 can be configured to exhibit a first pixel density. For example, during the first mode 100, display 14 can be configured such that the subpixels are grouped in a first way (see, e.g., FIG. 8). As shown in FIG. 8, groups of three subpixels can be operated as one pixel 22' during the first mode 100. Subpixels R1, G1, and B1 can be grouped as a first pixel 22'-1; subpixels R2, G2, and B2 can be grouped as a second pixel 22'-2; subpixels R3, G3, and B3 can be grouped as a third pixel 22'-2; and subpixels R4, G4, and B4 can be grouped as a fourth pixel 22'-4. Operated in this way, the first mode 100 can sometimes be referred to herein as a high PPI (pixels per inch) or high pixel density mode and can be employed when operating display 14 in a three-dimensional (3D) display mode for displaying 3D content. The 3D content can be output by presenting content at different angles to create stereoscopic disparity to produce a sense of depth. This example in which three subpixels are grouped as one pixel 22' in the first mode 100 is illustrative. In another embodiment, four subpixels can be grouped together as one pixel 22' in the first mode 100. In general, any number of two or more subpixels can be grouped together as being part of a pixel 22' in the first high PPI mode 100.

Figure 9:
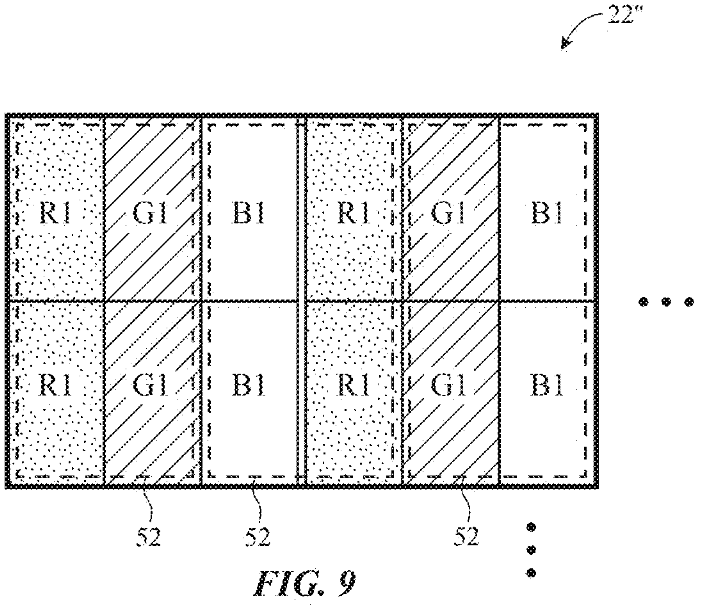
FIG. 9 is a top (plan) view showing a second grouping of display subpixels that can be employed during a second of the two operating modes of FIG. 7 in accordance with some embodiments.

During the second mode 102, display 14 can be configured to exhibit a second pixel density different than the first pixel density. For example, during the second display mode 102, display 14 can be configured such that the subpixels are grouped in a second way (see, e.g., FIG. 9). As shown in FIG. 9, groups of 12 subpixels can be operated as one pixel 22" during the second mode 102. Operated in this way, the second mode 102 can sometimes be referred to herein as a low PPI or low pixel density mode and can be employed when operating display 14 in a two-dimensional (2D) display mode for displaying 2D content. The example of FIG. 9 in which 12 subpixels can be grouped together to operate as a single pixel 22" during the second mode 102 is illustrative. As another example, 16 subpixels can be grouped together to operate as part of a pixel 22" during the low PPI mode 102. As another example, 24 subpixels can be grouped together to operate as part of a pixel 22" during the low PPI mode 102. In general, some multiple of the subpixel grouping in the high PPI mode can be grouped together to operate as a single pixel 22" during mode 102 (e.g., if 3 subpixels are grouped together in the first mode 100, then 3*k subpixels can be grouped together in the second mode 102; if 4 subpixels are grouped together in the first mode 100, then 4*k subpixels can be grouped together in the second mode 102; etc.).

The effective pixel density of the second display mode 102 can be equal to or less than half the pixel density of the first display mode 100. In general, each pixel 22' during the first high PPI mode 100 can have a first number of subpixels for displaying a first type of content, whereas each pixel 22" during the second low PPI mode 102 can have a second number of subpixels that is greater than the first number of sub pixels for displaying a second type of content different than the first type of content. The number of subpixels in a pixel 22" of the low PPI mode 102 can optionally be an integer multiple of the number of subpixels in a pixel 22' of the high PPI mode 100. The grouping of pixels 22' and 22" illustrated in FIGS. 8 and 9, respectively, can be independent of the pixel unit grouping, as shown by dotted regions 52.

Figure 10:
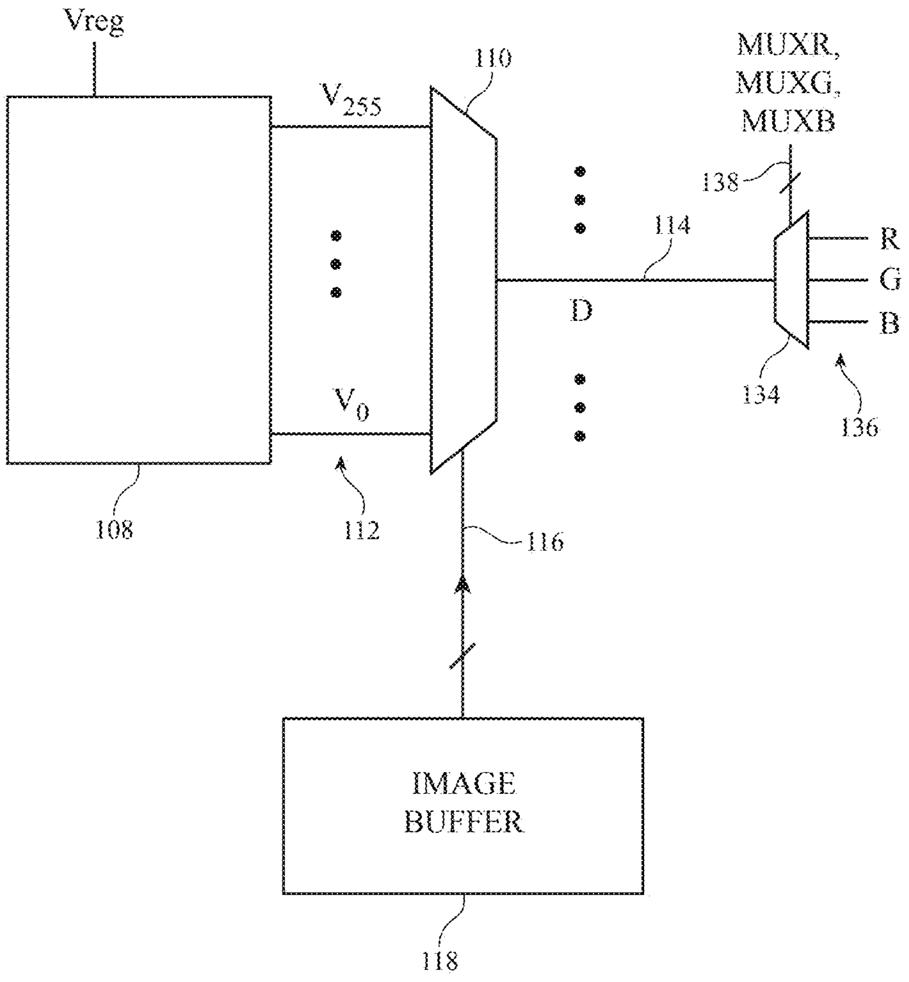
FIG. 10 is a diagram of illustrative gamma circuitry that can be included in a display of the type shown in FIGS. 1-9 in accordance with some embodiments.

The different pixels 22 illustrated in connection with FIGS. 8 and 9 can be associated with different gamma curves. FIG. 10 is a diagram of illustrative gamma circuitry that can be included in display 14 of the type shown in FIGS. 1-9. As shown in FIG. 10, the gamma circuitry can include a gamma block such as gamma block 108, a gamma multiplexing circuit such as gamma multiplexer 110, an image buffer such as image buffer 118, and a demultiplexing circuits such as demultiplexers 134.

Gamma block 108 may receive a regulated voltage Vreg and may generate a set of voltages V255 . . . V0 (e.g., using a voltage divider formed from a resistor tree and other circuitry). The regulated voltage Vreg may be generated by a brightness digital-to-analog converter (DAC) configured to receive a digital user brightness setting. The user brightness setting may, for example, be an overall level of display brightness for display 14 that a user of device 10 has supplied to device 10 using input-output devices 12 and/or that control circuitry 16 has determined based on other input such as input from an ambient light sensor. The value of Vreg may, for example, be relatively high when the brightness setting is high and may be relatively low when the brightness setting is low.

The values of V255 . . . V0 may be used in establishing a desired mapping between digital image data values (e.g., 0 . . . 255 or other suitable range of values) and analog voltage levels for use as analog image data signals for the pixels of display 14. To display images on display 14, image buffer 118 may supply digital image data to gamma multiplexer 110 via path 116. Gamma multiplexer 110 may supply a desired voltage from one of lines 112 to gamma multiplexer 110 to use as data signal D in response to the digital image data signal received from image buffer 118 on path 116. The gamma block circuitry and gamma multiplexer circuitry of display 14 may be used to supply signals to multiple data lines. The display driver circuitry of display 14 may, for example, include gamma block circuitry and gamma multiplexer circuitry that implement the functions of gamma block 108 and gamma multiplexer 110 of FIG. 10. Each gamma multiplexer 110 may, for example, be associated with a respective one of the data lines in display 14 and may supply that data line with an appropriate data line signal.

Display 14 may contain subpixels of different colors (e.g., red subpixels R, green subpixels G, and blue subpixels B). Data signals D may be demultiplexed onto corresponding subpixel data lines 136 using data line demultiplexer circuitry such as data line demultiplexer 134. There may be a demultiplexer such as demultiplexer 134 associated with each column of red, green, and blue pixels. During operation, the voltage on line 114 may be placed in a state appropriate for a red subpixel while control signal MUXR is taken high to direct demultiplexer 134 to route the voltage on line 114 to red subpixel data line R. Control signals MUXG and MUXB may likewise be asserted to demultiplex the signal on line 114 onto data lines G and B.

As described above, the values of V255. . . . V0 output by gamma block 108 may be used to establish a gamma mapping between the digital image data values and the analog image data signals for programming the pixels/subpixels of display 14. This gamma mapping is sometimes represented by a gamma curve. In accordance with some embodiments, separate pixels 22' or 22' can employ different gamma curves. In the example of FIG. 8, the different pixels 22', each including only three subpixels, can employ one or more different gamma curves. In the example of FIG. 9, separate pixels 22", each including 12 subpixels, can employ one or more different gamma curves.

Figure 11:
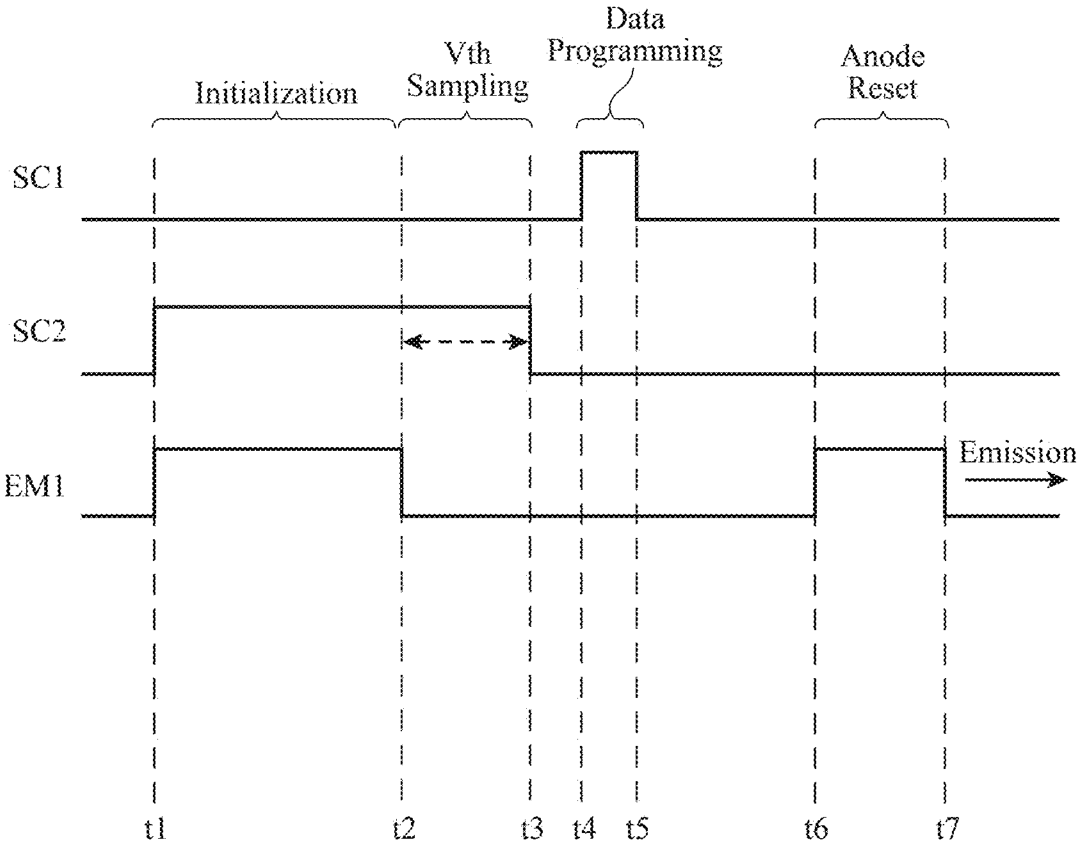
FIG. 11 is a timing diagram of illustrative pixel control signals during a refresh period in accordance with some embodiments.

FIG. 11 is a timing diagram of illustrative pixel control signals for operating one or more subpixels of the type described in connection with FIG. 4 during a refresh period in accordance with some embodiments. Prior to time t1, scan control signals SC1 and SC2 can be deasserted (e.g., driven low) to deactivate data loading transistor T2 and reference transistor T3, respectively. Emission signal EMI can be asserted (e.g., driven low) to activate the shared p-type silicon emission transistor T5 while deactivating the anode reset transistor T4.

At time t1, signal SC2 can be asserted (e.g., driven high) to activate data loading transistor T2, and signal EMI can be deasserted (e.g., driven high) to deactivate emission transistor T5. This time period during which signals SC2 and EMI are both driven high is sometimes referred to and defined herein as an initialization phase. During the initialization phase, transistor T3 is switched on to load reference voltage Vref onto the gate (G) terminal of drive transistor T1 while transistor T4 is switched on to load anode reset voltage Var onto the anode terminal of diode 26. During the initialization phase/period, the gate-to-source voltage Vgs of drive transistor T1 will therefore be biased to (Vref-Var).

At time t2, emission signal EM1 is driven low while signal SC2 remains high. This marks the end of the initialization phase and the beginning of the threshold voltage (Vth) sampling phase. Driving signal EM1 low will deactivate anode reset transistor T4 while activating emission transistor T5. This will cause transistor T5 to drive the drain (D) terminal of drive transistor T1 up to VDDEL, which will result in the source terminal of transistor T1 to charge up to one Vth below the Vref level at the gate of transistor T1, where Vth represents the threshold voltage of transistor T1. In other words, the source terminal of transistor T1 will charge up to (Vref-Vth) during the Vth sampling phase from time t2 to t3. At time t3, signal SC2 is deasserted (e.g., driven low) to deactivate transistor T3, marking the end of the threshold voltage sampling phase. As a result, Vth will be stored on capacitor Cst.

From time t4 to t5, signal SCI may be pulsed high to temporarily activate data loading transistor T2. Activating transistor T2 drives the gate terminal of transistor T1 to a data voltage corresponding to a new data signal value for that subpixel. Since transistor T4 is deactivated at this time, the anode terminal is a high impedance node so capacitor Cst cannot discharge (e.g., the voltage across capacitor Cst will remain equal to Vt even though the drive transistor gate terminal will be driven to a new data voltage level). This time period between t6 and t7 during which transistor T2 is activated to load in a data voltage can be referred to as the data loading/programming phase.

From time t6 to t7, emission signal EM1 can be pulsed high to temporarily activate anode reset transistor T4. Activating the anode reset transistor T4 can drive the anode terminal of diode 26 to the anode reset voltage level Var one more time prior to the emission phase. This time period between t6 and t7 during which transistor T4 is activated to reset the anode terminal of diode 26 to Var can thus be referred to as the anode reset phase.

At time t7, emission signal EMI can be asserted (e.g., driven low) to mark the beginning of the emission phase. During the emission phase/period, diode 26 can emit an amount of light that is proportional to the new data signal voltage programmed during the data loading phase. During the emission phase, the resulting Vgs of drive transistor T1 can be a function of Vth as stored across capacitor Cst, but since the final emission current is proportional to Vgs minus Vth, the emission current will be independent of Vth since Vth will cancel out. Such type of operation in which Vth is canceled out during the emission phase can be referred to as an "in-pixel" threshold voltage canceling operation.

Figure 12:
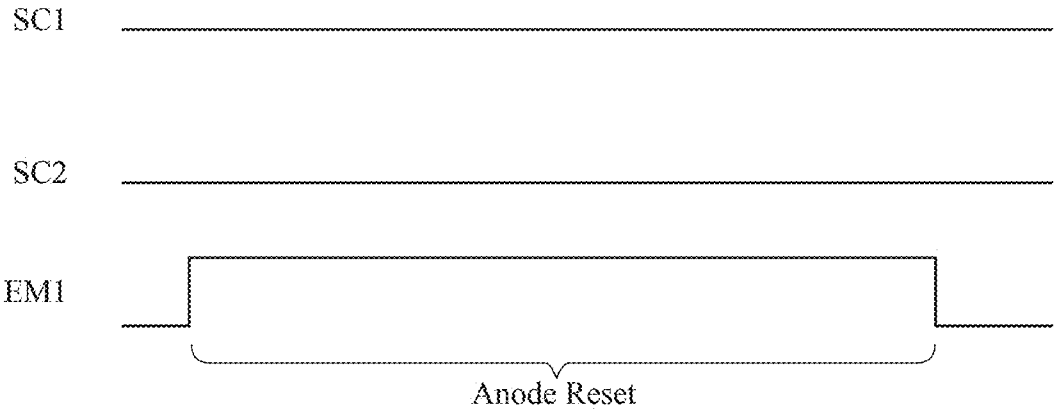
FIG. 12 is a timing diagram of illustrative pixel control signals during a vertical blanking period in accordance with some embodiments.

In accordance with some embodiments, the pixel circuitry of the type described in connection with FIGS. 1-11 can be employed in a low refresh rate display (see, e.g., FIG. 3). FIG. 12 is a timing diagram of illustrative pixel control signals during a vertical blanking period of a low refresh rate display operation. As shown in FIG. 12, signals SCI and SC2 can remain deasserted during the entirety of the vertical blanking period. During the vertical blanking period, however, the emission signal EM1 can be asserted one or more times to perform at least one anode reset operation (e.g., to drive the anode terminal of diode 26 to anode reset voltage Var). By requiring only the emission gate driver outputting EM1 to be asserted during the vertical blanking period (while SC1 and SC2 remain completely idle), the dynamic power consumption of the peripheral gate driver circuitry 34 can be minimized. In general, signal EM1 can be pulsed only one time during a vertical blanking period, two or more times during a vertical blanking period, three or more times during a vertical blanking period, four to ten times during a vertical blanking period, or more than 10 times during a vertical blanking period.

Although the methods of operations are described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative and various modifications can be made by those skilled in the art without departing from the scope and spirit of the described embodiments. The foregoing embodiments may be implemented individually or in any combination.

What is claimed is:

1. Display circuitry comprising:

a first subpixel having a first light-emitting diode, a first drive transistor coupled between a power supply line and the first light-emitting diode, and a first semiconducting oxide anode reset transistor coupled between an anode of the first light-emitting diode and an anode reset voltage line that runs orthogonal to the power supply line, wherein the first semiconducting oxide anode reset transistor has a gate terminal configured to receive a control signal;

a second subpixel having a second light-emitting diode, a second drive transistor coupled between the power supply line and the second light-emitting diode, and a second semiconducting oxide anode reset transistor coupled between an anode of the second light-emitting diode and the anode reset voltage line, wherein the second semiconducting oxide anode reset transistor has a gate terminal configured to receive the control signal, and wherein the first and second subpixels have mirrored transistor layouts and are disposed along a row of subpixels; and an emission transistor shared between at least the first and second subpixels, the emission transistor being coupled to a source-drain terminal of the first drive transistor of the first subpixel and to a source-drain terminal of the second drive transistor of the second subpixel.

2. The display circuitry of claim 1, further comprising:

a third subpixel having a third drive transistor coupled in series with a third light-emitting diode and having a source-drain terminal coupled to the emission transistor; and a fourth subpixel having a fourth drive transistor coupled in series with a fourth light-emitting diode and having a source-drain terminal coupled to the emission transistor.

3. The display circuitry of claim 2, wherein:

the first and third subpixels comprise subpixels of a first color; and the second and fourth subpixels comprise subpixels of a second color different than the first color.

4. The display circuitry of claim 3, wherein:

the first and third subpixels are disposed along a first column; and the second and fourth subpixels are disposed along a second column adjacent to the first column.

5. The display circuitry of claim 1, wherein:

the first drive transistor comprises a semiconducting oxide transistor; and the emission transistor comprises a p-type silicon transistor.

6. The display circuitry of claim 1, further comprising:

an emission line coupled to a gate terminal of the emission transistor, to the gate terminal of the first semiconducting oxide anode reset transistor, and to the gate terminal of the second semiconducting oxide anode reset transistor, wherein the control signal is provided on the emission line.

7. The display circuitry of claim 1, wherein:

the first subpixel further comprises a first reference transistor having a first source-drain terminal coupled to a gate terminal of the first drive transistor and having a second source-drain terminal coupled to a reference voltage line; and the second subpixel further comprises a second reference transistor having a first source-drain terminal coupled to a gate terminal of the second drive transistor and having a second source-drain terminal coupled to the reference voltage line.

8. The display circuitry of claim 7, wherein the first subpixel further comprises:

a data loading transistor having a first source-drain terminal coupled to the gate terminal of the first drive transistor and having a second source-drain terminal coupled to a data line.

9. The display circuitry of claim 8, wherein the first subpixel further comprises:

a first capacitor coupled between the gate terminal of the first drive transistor and the anode of the first light-emitting diode; and a second capacitor coupled between the anode of the first light-emitting diode and the reference voltage line or a power supply line.

10. The display circuitry of claim 1, wherein the emission transistor is configured to receive the control signal that is pulsed one or more times during a vertical blanking period.

11. Display circuitry operable to switch between a first mode and a second mode, comprising:

a plurality of subpixels arranged in rows and columns, wherein:

at least two subpixels in the plurality of subpixels are coupled to a shared emission transistor;

when the display circuitry is switched to operate in the first mode, the plurality of subpixels are organized into pixels each having a first number of subpixels; and when the display circuitry is switched to operate in the second mode, the plurality of subpixels are organized into pixels each having a second number of subpixels different than the first number of subpixels.

12. The display circuitry of claim 11, wherein at least two additional subpixels in the plurality of subpixels are coupled to the shared emission transistor.

13. The display circuitry of claim 11, wherein:

during the first mode, the plurality of subpixels are configured to output three- dimensional content; and during the second mode, the plurality of subpixels are configured to output two- dimensional content.

14. The display circuitry of claim 11, wherein:

the first number of subpixels in each of the pixels during the first mode is equal to three or more; and the second number of subpixels in each of the pixels during the second mode is equal a multiple of the first number.

15. Display circuitry comprising:

a first subpixel disposed in a first row and a first column;

a second subpixel disposed in the first row and a second column;

a third subpixel disposed in a second row and the first column;

a fourth subpixel disposed in the second row and the second column;

an emission transistor shared among the first, second, third, and fourth subpixels; and an emission line coupled to a gate terminal of the emission transistor, wherein the first and second subpixels are symmetrical with respect to the third and fourth subpixels about the emission line.

16. The display circuitry of claim 15, further comprising:

a reference voltage line that is shared among the first, second, third, and fourth subpixels; and an anode reset voltage line that is shared among the first, second, third, and fourth subpixels.

17. The display circuitry of claim 15, further comprising:

a first scan line driver configured to output a first scan signal to a first data loading transistor in the first subpixel and to a second data loading transistor in the second subpixel; and a second scan line driver configured to output a second scan signal to a third data loading transistor in the third subpixel and to a fourth data loading transistor in the fourth subpixel.

18. The display circuitry of claim 17, further comprising:

a third scan line driver configured to output a third scan signal to a first reference transistor in the first subpixel, to a second reference transistor in the second subpixel, to a third reference transistor in the third subpixel, and to a fourth reference transistor in the fourth subpixel.

19. The display circuitry of claim 15, wherein:

the first and third subpixels comprise subpixels of a first color; and the second and fourth subpixels comprise subpixels of a second color different than the first color.

* * * * *